(12) United States Patent
Brouwer et al.

(10) Patent No.: US 11,020,911 B2
(45) Date of Patent: Jun. 1, 2021

(54) SYSTEM AND METHOD FOR ASSEMBLING A PRESSURE UNIT WITH A CONTAINER

(71) Applicant: AIROPACK TECHNOLOGY GROUP B.V., RK Waalwijk (NL)

(72) Inventors: Mark Brouwer, RE Waalwijk (NL); Phil Regan, RE Waalwijk (NL)

(73) Assignee: AIROPACK TECHNOLOGY GROUP B.V., Waalwijk (NL)

( * ) Notice: Subject to any disclaimer, the term of this patent is extended or adjusted under 35 U.S.C. 154(b) by 149 days.

(21) Appl. No.: 15/775,444

(22) PCT Filed: Nov. 11, 2016

(86) PCT No.: PCT/IB2016/056792
§ 371 (c)(1),
(2) Date: May 11, 2018

(87) PCT Pub. No.: WO2017/081644
PCT Pub. Date: May 18, 2017

(65) Prior Publication Data
US 2018/0370150 A1    Dec. 27, 2018

(30) Foreign Application Priority Data

Nov. 13, 2015  (CH) .................................... 01660/15

(51) Int. Cl.
*B29C 65/16*         (2006.01)
*B29C 65/00*         (2006.01)
(Continued)

(52) U.S. Cl.
CPC .......... *B29C 65/16* (2013.01); *B29C 65/1654* (2013.01); *B29C 65/1658* (2013.01);
(Continued)

(58) Field of Classification Search
CPC . B29C 65/16; B29C 65/1654; B29C 65/1661; B29C 65/1664; B29C 65/1667;
(Continued)

(56) References Cited

U.S. PATENT DOCUMENTS 3,769,117 A  * 10/1973  Bowen ................ B29C 65/1661
                                                        156/69
5,501,759 A  *  3/1996  Forman ............. A61M 25/1034
                                                        156/272.8
(Continued)

FOREIGN PATENT DOCUMENTS

EP        2 644 309 A1    10/2013
GB        2 446 385 A      8/2008
(Continued)

OTHER PUBLICATIONS

International Search Report for International Application No. PCT/IB2016/056792 dated Feb. 16, 2017.
(Continued)

*Primary Examiner* — Daniel McNally
(74) *Attorney, Agent, or Firm* — Lathrop GPM LLP; Wm. Tucker Griffith

(57) ABSTRACT

A new method for fully automatically manufacturing a fluid container with a pressure unit is described, which pressure unit is mounted in a fluid container. In a station the high-pressure container of the pressure unit is mounted with the closure and the bottom part and is clamped at the upper and lower ends by clamping means and is rotated by rotating means associated with the clamping means. The rotating pressure unit is welded by first laser means and by second laser means, whereas the laser beam of the first laser means being directed to a first joint area of the bottom part of the pressure unit with the container, and the laser beam of the second laser means being directed to a second joint area of the bottom part of the pressure unit with the container, which
(Continued)

first and second joint area are separated at a distance to each other.

14 Claims, 4 Drawing Sheets

(51) Int. Cl.
*B65D 83/64* (2006.01)
*B65D 83/66* (2006.01)
*B29L 31/00* (2006.01)
*B29K 667/00* (2006.01)
*B29K 669/00* (2006.01)

(52) U.S. Cl.
CPC ...... *B29C 65/1661* (2013.01); *B29C 65/1664* (2013.01); *B29C 65/1667* (2013.01); *B29C 66/1122* (2013.01); *B29C 66/1222* (2013.01); *B29C 66/1224* (2013.01); *B29C 66/232* (2013.01); *B29C 66/543* (2013.01); *B29C 66/545* (2013.01); *B29C 66/612* (2013.01); *B29C 66/65* (2013.01); *B29C 66/71* (2013.01); *B65D 83/64* (2013.01); *B65D 83/663* (2013.01); *B29K 2667/003* (2013.01); *B29K 2669/00* (2013.01); *B29L 2031/7142* (2013.01)

(58) Field of Classification Search
CPC .............. B29C 66/1122; B29C 66/234; B29C 66/543; B29C 66/545; B29C 66/612
See application file for complete search history.

(56) References Cited

U.S. PATENT DOCUMENTS

| 2005/0225991 | A1* | 10/2005 | Yamazaki | B29C 66/348 362/362 |
| 2006/0237118 | A1* | 10/2006 | Boltshauser | B29B 13/025 156/86 |
| 2007/0125809 | A1* | 6/2007 | Regan | B65D 83/64 222/389 |
| 2007/0131639 | A1* | 6/2007 | Nakaya | B29C 65/1635 215/232 |
| 2013/0233481 | A1* | 9/2013 | Hepp | B29C 65/02 156/272.8 |

FOREIGN PATENT DOCUMENTS

| WO | 2005/082744 A1 | 9/2005 | |
| WO | 2014/083531 A2 | 6/2014 | |
| WO | WO-2014083531 A2 * | 6/2014 | ............. B65D 83/64 |

OTHER PUBLICATIONS

Written Opinion for International Application No. PCT/IB2016/056792 dated Feb. 16, 2017.

* cited by examiner

SYSTEM AND METHOD FOR ASSEMBLING A PRESSURE UNIT WITH A CONTAINER

CROSS-REFERENCE TO RELATED APPLICATIONS

This application is a National Stage application of International Patent Application No. PCT/IB2016/056792, filed on Nov. 11, 2016, which claims priority to Swiss Patent Application No. CH 01660/15, filed on Nov. 13, 2015, each of which is hereby incorporated by reference in its entirety.

TECHNICAL FIELD

The invention pertains to a system and a method for assembling a pressure unit with a container.

BACKGROUND OF THE INVENTION

Such a system and method for manufacturing pressure units and assembling them with containers is described in WO-A-2014/083531. In an automatic production line pressure units are produced by first assembling an upper insert and a bottom part to the cylindrical high pressure container with an upper and a lower open end. The container with the mounted upper insert and the mounted bottom part are transported to a welding station in which the container is rotated by rotating means and the upper insert is welded by a laser directed to the upper part and the bottom part is welded by a laser directed to the bottom part. Thereafter the assembled pressure unit is mounted into the product container, which is welded to the pressure unit at the bottom part thereof.

Normally the weld of the bottom part and the cylindrical container is sufficient to withstand higher pressures of 8 bar and more. However, if the container will be deformed by any severe impact under extreme conditions which are required for standard tests specifically designed for plastic aerosol packages pieces, the rim of the container may break off.

SUMMARY OF THE INVENTION

It is the object of the present invention to provide an improved method for fixedly connecting a bottom part to the cylindrical container of a pressure unit, such that the connection stands pressures higher as 8 or 10 bar.

This object is accomplished by a method for assembling a pressure unit with a container and by a system for assembling a pressure unit with a container according to the present invention.

In the method according to the invention, a pressure unit is fully automatically assembled with a fluid container, which pressure unit having a high pressure container with a bottom part and a closure with a pressure control device, wherein pressure unit is mounted in the fluid container, and the bottom part and the closure are mounted automatically to the high-pressure container. The closure and the bottom part are welded into the high-pressure container, and the container and the pressure unit are pre-assembled and the container is welded in a welding station to the pressure unit, in that the fluid container with the mounted pressure unit is clamped at the upper and lower ends by clamping means and is rotated by rotating means associated with the clamping means and that the rotating fluid container is welded to the bottom part of the pressure unit in the welding station having a first laser means and a second laser means, whereas the laser beam of the first laser means being directed to a first joint area of the bottom part and the container to provide a first weld ring, and the laser beam of the second laser means being directed to a second joint area of the bottom part and the container to provide a second weld ring, which first and second weld rings are separated at a second distance to each other.

According to another aspect of the present invention, the laser beam of the first laser means is directed to the container such that the first weld ring is produced at a first distance from the lower edge of the container, which is between 1 and 3 mm thereof.

According to another aspect of the present invention, the laser beam of the first laser means and the laser beam of the second laser means are directed to the container such that the weld rings have a width, which is about twice the first distance, and between 2 and 6 mm.

According to another aspect of the present invention, the distance between the first weld ring and the second weld ring is between 10 and 30 mm, preferably at about 15 mm.

According to another aspect of the present invention, the container is rotated the container is rotated around its vertical axis at least one full rotation over 360°.

According to another aspect of the present invention, the container is rotated one full rotation over 360° and additionally with an overlap of 10° to 20°.

According to another aspect of the present invention, the container is rotated between about two and at most ten full rotations during welding, preferably between three and six full rotations.

The system according to the present invention is provided for fully automatically manufacturing a pressure unit having a high pressure container with a bottom part and a closure with a pressure control device, which pressure unit is to be mounted in a fluid container. The system comprises a production line with a first station for automatic mounting of the bottom part and the closure to the high pressure container, a second station for welding the bottom part and the closure into the high pressure container, a third station for pre-assembling the fluid container and the pressure unit and a fourth station for welding the fluid container to the pressure unit. Clamping means are provided for clamping the fluid container with the mounted pressure unit at the upper and lower ends and rotating means are associated with the clamping means for rotating the fluid container during welding, wherein the fourth welding station having a first laser means and a second laser means, whereas the first laser means emits a laser beam to be directed to a first joint area of the bottom part and the container, and the second laser means emits a laser beam to be directed to a second joint area of the bottom part and the container, which first and second joint area are separated at a second distance to each other.

In the system according to another aspect of the present invention, the first laser means and the second laser means are arranged in the same welding station.

In the system according to another aspect of the present invention, the first laser means is arranged in a first station with first clamping means and first rotating means, and the second laser means is arranged in a second station with second clamping means and second rotating means.

In the system according to another aspect of the present invention, the first laser means and the second laser means are arranged at a distance next to one another.

In the system according to another aspect of the present invention, the first laser means and the second laser means are arranged at opposite positions with respect to the container to be rotated.

BRIEF DESCRIPTION OF THE DRAWINGS

In the following, the invention is described in greater detail, by way of example, with reference to the accompanying drawings, in which.

DETAILED DESCRIPTION OF THE INVENTION

Figure 1:
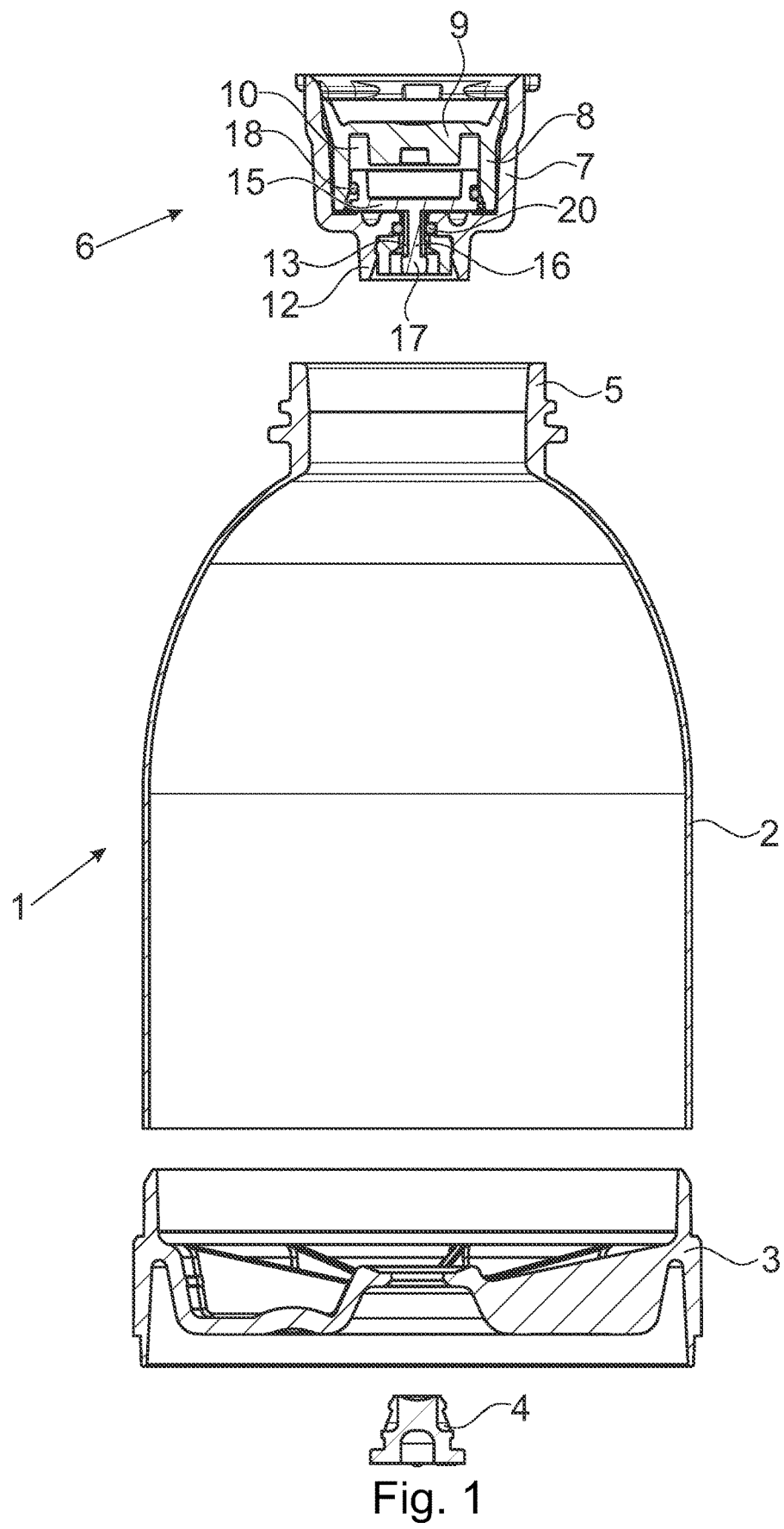
FIG. 1 shows a cross-section of a pressure unit in exploded view.

FIG. 1 shows an exploded view of a pressure unit 1. The pressure unit 1 comprises a high pressure container 2 with a bottom part 3 and a plug 4 for closing the pressure container 2 at the bottom. On top of the pressure container 2 a rim 5 is provided for holding a pressure control device 6 which comprises a cuplike closure 7, in which a cylindrical member 8 with a closed upper end 9 is mounted, such that a reference pressure chamber 10 is provided. The bottom part 12 of the cuplike closure 7 has a valve opening 13. In the reference pressure chamber 10 a piston 15 with a downward protruding stem 16 and a cylindrical end stop 17 is adapted. Outside of the piston 15 an O-ring 18 is provided for sealing the piston 15 towards the inner wall of the cylindrical member 8. In the downside end of the valve opening 13 an O-ring 20 is provided which cooperates with the end stop 17. The working of the pressure unit 1 is commensurate to the description of WO-A-2005/082744, which is herewith incorporated by reference.

Figure 2:
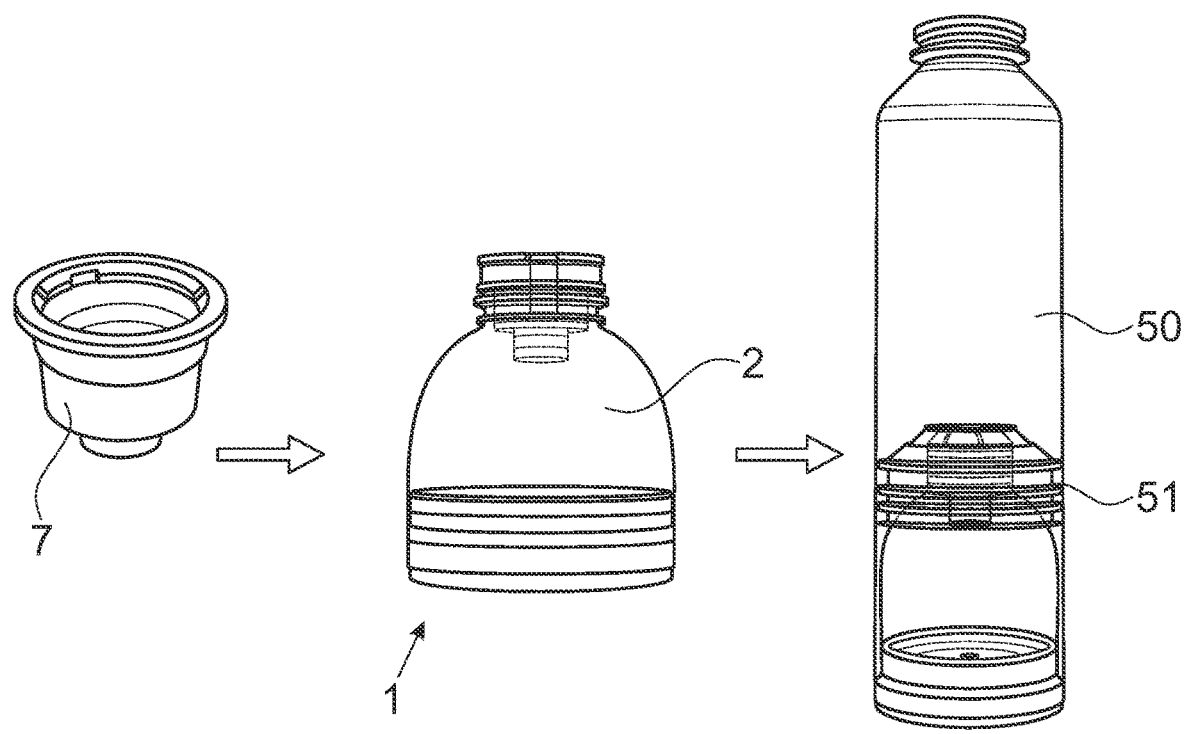
FIG. 2 shows an insert, an assembled pressure unit and the pressure unit assembled in a plastic container.

In FIG. 2 the ring-shaped insert or closure 7, the pressure unit 1 with the high pressure container 2 and a container or bottle 50 with a further piston 51 are shown, commensurate to the description of WO-A-2005/082744. The high pressure container 2 in the present configuration is made from a plastic bottle which is formed from a pre-form of PET by stretch blow-moulding. The bottom part of the formed bottle is then cut off and a bottom part 3 is mounted to the high pressure container 2 and the closure 7 is mounted to the top of the high pressure container 2.

Figure 3:
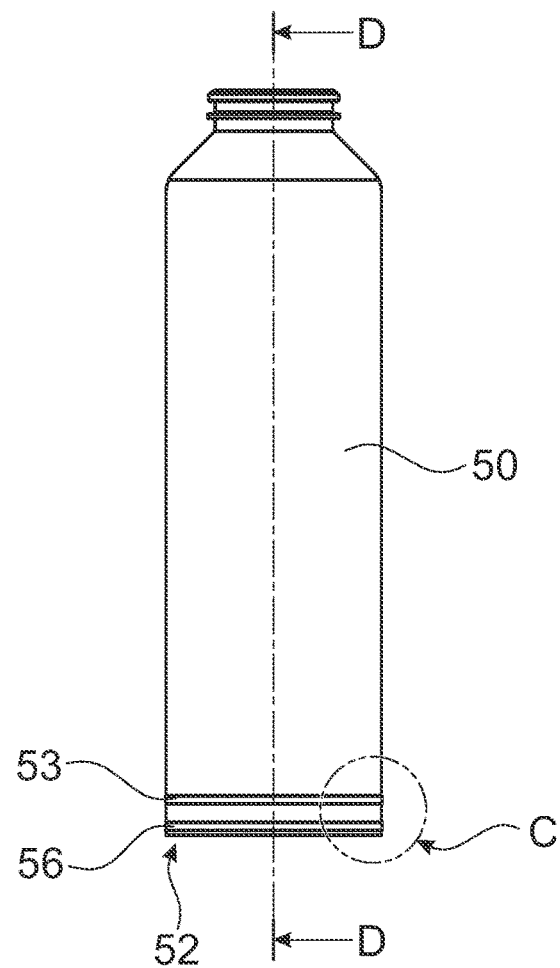
FIG. 3 shows the plastic container for a fluid to be dispensed with indications of the welding rings on the outer wall.
Figure 4:
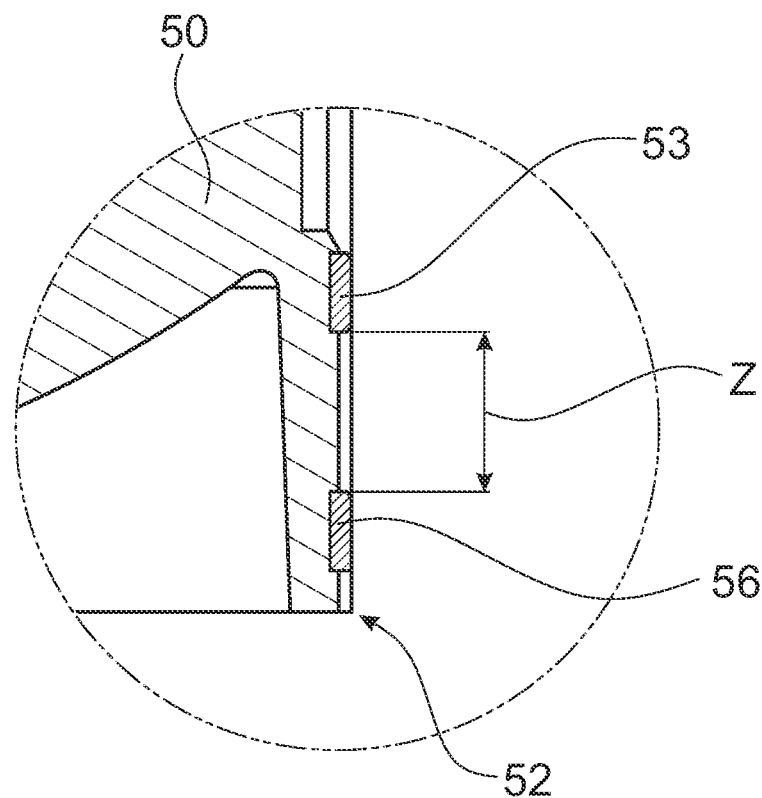
FIG. 4 shows part of a cross-section along the line D-D in FIG. 3.
Figure 5:
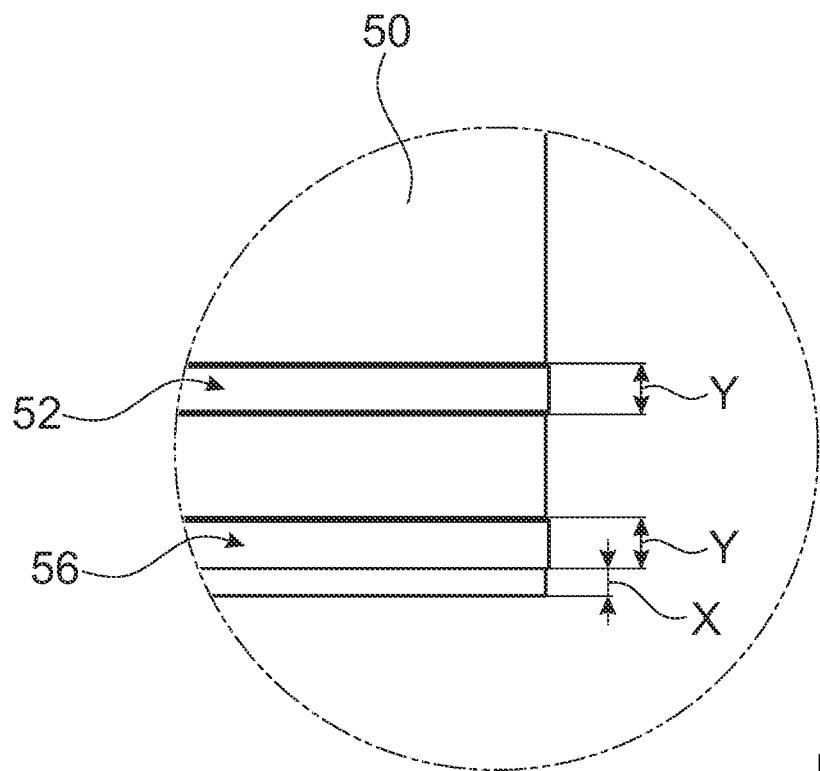
FIG. 5 shows detail C indicated in FIG. 3.

FIG. 3 shows the fluid container 50 with a double welding ring in the neighbourhood of the bottom 52. FIG. 4 shows a detail of the welding rings 53 and 56 in cross-section along the lines D-D of FIG. 3 and FIG. 5 shows detail C of FIG. 3. The first welding ring 56 is placed at a small first distance X from the lower edge 54 of the fluid container 50, which is between 1 and 3 mm thereof. A second welding ring 53 is placed at a larger second distance Z from the first weld ring 56, which is between 10 and 30 mm, preferably at about 15 mm. Both welding rings 56 and 53 have a width Y, which is about twice the first distance X, i.e. between 2 and 6 mm.

The pressure unit 1 is of a plastic material, which may be polycarbonate or any plastic material on polyester or PET basis.

Figure 6:
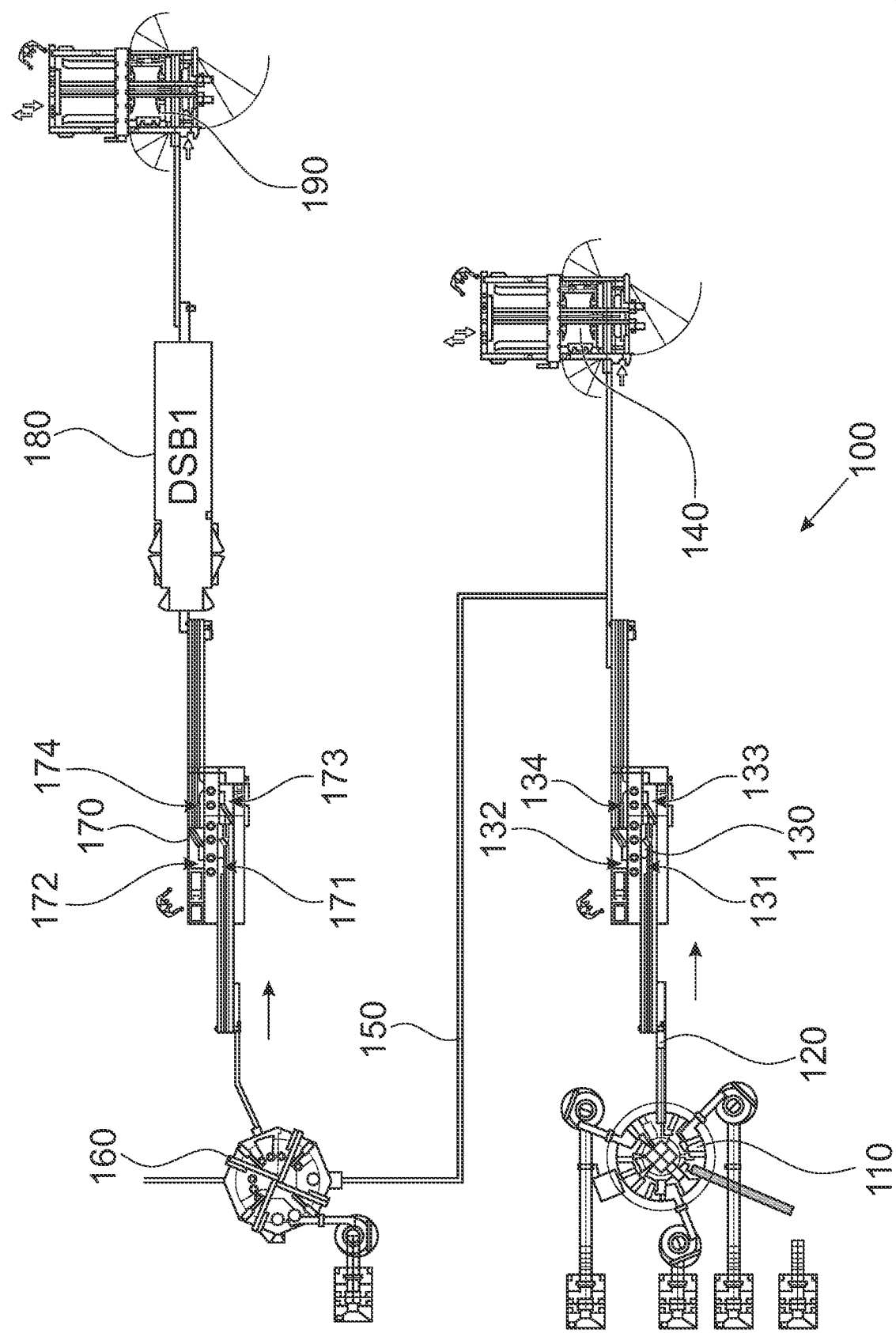
FIG. 6 shows a schematic view on a production line.

In FIG. 6 the production line 100 for producing the pressure unit 1 and for producing the fluid container or bottle 50 for being connected to the pressure unit 1 is depicted. In station 110 the insert 7 and the bottom part 3 are mounted to the high-pressure container 2 and are transported by line 120 to the welding station 130, where the ring-shaped inserts 7 and the bottom parts 3 are laser-welded to the high-pressure containers 2 for producing the pressure unit 1. For laser welding the assembled high-pressure containers 2 are rotated and two lasers are mounted in station 130, wherein the laser beams are directed to the bottom and upper parts of the high-pressure container 2. The laser equipment used is NOVALAS-C system of Leister Process Technology, Sarnen, Switzerland. In station 140 the assembled pressure units 1 are bulk packed on a pallet and shrink-wrapped by a foil ready for transportation. On the other hand, the assembled pressure units 1 may be transported over line 150 to pre-assembling station 160 in which the pressure units 1 are mounted to the fluid containers 50. After pre-assembling, the fluid containers 50 are laser-welded in welding station 170, wherein the bottom part 3 of the pressure unit 1 is laser-welded to the container 50. In this station 170 the pre-assembled pressure unit 1 and the fluid container 50 are also rotated and laser welded. In subsequent station 180 a shrink sleeve with product and producer information (logo, product name, product information etc.) is connected to the fluid container 50 by heating the shrink sleeve. The finished fluid containers 50 are then bulk packed and shrink-wrapped on a pallet in station 190.

The production process of the pressure unit 1 and the assembling of the pressure unit 1 with the fluid container 50 is similar as described in WO-A-2014/083531. In the first stage of the production process the insert or closure 7 and the bottom part 3 are assembled to the high-pressure container 2. Thereafter the upper and lower pans of the assembled pressure unit 1 are clamped by a clamp mechanism 131, for example clamps as known in the art of automation, and rotated by rotator mechanism 132 in welding station 130, such as a rotary device as known in the art of automation and illustrated in FIG. 6. An upper stationary laser means 133 and a lower stationary laser means 134 direct an upper laser beam and a lower laser beam respectively to the connecting area of the insert or closure 7 with the high-pressure container 2 and to the connecting area of the bottom part 3 and the high-pressure container 2 respectively.

In the next stage the so produced pressure unit 1 is then mounted in the pre-assembling station 160 into the fluid container 50, which is provided for dispensing a fluid as foam, gel or the like. The fluid container 50 with the mounted pressure unit 1 is then clamped at upper and lower ends of the fluid container 50 by a clamp mechanism 171 and rotated by a rotator mechanism 172 around its vertical axis in welding station 170, whereas the rotator mechanism 172 is associated with the clamp mechanism 171. A first upper stationary laser means 173 and a second lower stationary laser means 174 are mounted stationary in welding station 170, which emit an upper and a lower laser beam respectively and which are directed to the lower end of the fluid container 50 to provide the first welding ring 56 and the second welding ring 53, as has been depicted in FIGS. 3 to 5. The first and second stationary laser means 173 and 174 are arranged at a distance next to one another or at opposite positions with respect to the rotating fluid container 50.

Alternatively, the first and second stationary laser means 173 and 174 can be provided in two different stations, which have their own clamping mechanism and their own rotator mechanism. Thus, laser welding of the pressure unit 1 with the fluid container 50 with the first and second welding rings 56 and 53 can be provided simultaneously or in series, i.e. one after another.

In practice, the fluid container 50 is rotated around its vertical axis at least one full rotation over 360°. There may be additionally a small overlap of 10° to 20°. In order to obtain a stronger weld, the fluid container 50 may be rotated about two times and at most ten times around its vertical axis. Preferably, if a stronger weld is required, there may be about three to six rotations during welding of the pressure unit 1 to the fluid container 50.

While the present invention has been illustrated and described with respect to a particular embodiment thereof, it should be appreciated by those of ordinary skill in the art that various modifications to this invention may be made without departing from the spirit and scope of the present.

The invention claimed is:

1. A method for fully automatically assembling a plastic pressure unit with a plastic fluid container, said pressure unit having a high-pressure container with a bottom part and a pressure control device comprising an upper closure for the high-pressure container, wherein the method comprises;
   mounting the upper closure and the bottom part automatically to the high-pressure container;
   welding the upper closure and the bottom part into the high pressure container for providing a mounted pressure unit;
   pre-assembling the fluid container and the mounted pressure unit using a clamp mechanism comprising clamps for clamping the fluid container with the mounted pressure unit at upper and lower ends of the fluid container, and also using a rotator mechanism comprising a rotary device for rotating the fluid container around its vertical axis during welding, wherein said rotator mechanism is associated with said clamp mechanism;
   rotating the fluid container with the rotator mechanism;
   welding the rotating fluid container to the bottom part of the pressure unit in a welding station, said welding station having a first upper stationary laser means with a first upper laser beam and a second lower stationary laser means with a second lower laser beam;
   directing the first upper laser beam of the first upper stationary laser means to a first joint area of the bottom part and the fluid container to provide a first upper welding ring;
   directing the second lower laser beam of the second lower stationary laser means to a second joint area of the bottom part and the fluid container to provide a second lower welding ring,
   wherein the first upper and second lower welding rings are separated in a direction of the vertical axis of the fluid container at a first distance to each other.

2. The method according to claim 1, wherein the first upper laser beam of the first upper stationary laser means is directed to the fluid container such that the first upper welding ring is produced at a second distance from a lower edge of the fluid container, which is between 1 and 3 mm.

3. The method according to claim 2 wherein said first distance between the first upper welding ring and the second lower welding ring is between 10 and 30 mm.

4. The method according to claim 3, wherein the distance between the first tipper weld ring and the second lower weld ring is about 15 mm.

5. The method according to claim 2, wherein the first upper laser beam of the first upper stationary laser means and the second lower laser beam of the second lower stationary laser means are directed to the fluid container such that the first upper and second lower welding rings have a width that is about twice the second distance, and between 2 and 6 mm.

6. The method according to claim 1, wherein the fluid container is rotated around its vertical axis at least one full rotation over 360°.

7. The method according to claim 6, wherein the fluid container is rotated between about two and at most ten full rotations during welding.

8. The method according to claim 7, wherein the fluid container is rotated between about three and six full rotations.

9. The method according to claim 6, wherein the fluid container is rotated one full rotation over 360° and additionally with an overlap of 10° to 20°.

10. A system for fully automatically assembling a plastic pressure unit with a plastic fluid container, said pressure unit having a high-pressure container with a bottom part and a pressure control device comprising an upper closure, whereas said pressure unit being mounted in a fluid container, said system comprising:
   a production line comprising:
   a first station for automatic mounting of the bottom part and the upper closure to the high-pressure container;
   a second station for welding the bottom part and the upper closure into the high-pressure container for providing a mounted pressure unit;
   a third station for pre-assembling the fluid container and the mounted pressure unit; and
   a fourth station for welding the fluid container to the mounted pressure unit,
   wherein a clamp mechanism comprising clamps is provided for clamping the fluid container with the mounted pressure unit at upper and lower ends of the fluid container, and a rotator mechanism comprising a rotary device, associated with the clamp mechanism, is provided for rotating the fluid container around its vertical axis during welding,
   wherein the fourth station includes at least a first upper stationary laser means, whereby the first upper stationary laser means emits a first upper laser beam to be directed to a first upper joint area of the bottom part and the fluid container,
   and whereby a second lower stationary laser means is provided which emits a second lower laser beam to be directed to a second lower joint area of the bottom part and the fluid container, which first upper and second lower joint areas are separated in a direction of the vertical axis of the fluid container at a first distance to each other.

11. The system according to claim 10, wherein the first upper stationary laser means and the second lower stationary laser means are arranged in the fourth welding station of the production line.

12. The system according to claim 11, wherein the first upper stationary laser means and the second lower stationary laser means are arranged at a distance next to one another.

13. The system according to claim 11, wherein the first upper stationary laser means and the second lower stationary laser means are arranged at opposite positions with respect to the fluid container to be rotated.

14. The system according to claim 10, wherein the first upper stationary laser means is arranged in the fourth welding station of the production line with first clamp mechanism and first rotator mechanism, and the second lower stationary laser means is arranged in an additional welding station of the production line with second clamp mechanism and second rotator mechanism.

* * * * *